(12) United States Patent
Gonthier

(10) Patent No.: US 6,718,095 B1
(45) Date of Patent: Apr. 6, 2004

(54) OPTICAL FILTERS AND METHOD OF MAKING THE SAME

(75) Inventor: François Gonthier, Ville Mont-Royal (CA)

(73) Assignees: ITF Technologies Inc., Ville St-Laurent (CA); ITF Optical Technologies Inc.

( * ) Notice: Subject to any disclaimer, the term of this patent is extended or adjusted under 35 U.S.C. 154(b) by 0 days.

(21) Appl. No.: 09/914,725

(22) PCT Filed: Mar. 9, 2000

(86) PCT No.: PCT/CA00/00250

§ 371 (c)(1),
(2), (4) Date: Sep. 4, 2001

(87) PCT Pub. No.: WO00/57224

PCT Pub. Date: Sep. 28, 2000

(30) Foreign Application Priority Data

Mar. 19, 1999 (CA) .......................................... 2266195

(51) Int. Cl.[7] ................................................. G02B 6/26
(52) U.S. Cl. .......................................... 385/43; 385/27
(58) Field of Search ............................ 385/15, 27, 39, 385/43

(56) References Cited

U.S. PATENT DOCUMENTS 4,946,250 A    8/1990   Gonthier et al. .......... 350/96.29
6,445,493 B2 * 9/2002   Kohnke et al. .......... 359/337.1

FOREIGN PATENT DOCUMENTS

| CA | 1284282 | 5/1991 |
|---|---|---|
| CA | 2258140 | 7/2000 |
| EP | 0 724 173 | 7/1996 |
| EP | 0 736 784 | 10/1996 |
| EP | 0 794 599 | 9/1997 |
| GB | 2183866 | 6/1987 |

OTHER PUBLICATIONS

Gonthier et al., "Broadband All–Fiber Filters for Wavelength Division Multiplexing Application", Apr. 3, 1989, pp. 1290–1292, Appl. Phys. Lett.

* cited by examiner

*Primary Examiner*—John Lee
*Assistant Examiner*—Sarah U. Song
(74) *Attorney, Agent, or Firm*—George J. Primak

(57) ABSTRACT

An optical filter is produced that has a desired spectral response. This is done by first decomposing the desired spectral response into individual simulated responses (F1 . . . F4) using a suitable computer program. Then tapered fiber filters are manufactured with parameters that closely match the individual responses. And finally the tapered fiber filters are concatenated on a single-mode fiber to produce the optical filter with a total response that closely matches the desired spectral response.

10 Claims, 5 Drawing Sheets

OPTICAL FILTERS AND METHOD OF MAKING THE SAME

FIELD OF THE INVENTION

This invention relates to optical clean-up filters which are optical wavelength filters producing a desired spectral response. To achieve such desired spectral response, the invention uses a plurality of tapered fiber filters in series matching predetermined spectral properties. The invention also includes a method for concatenating the tapered fiber filters to achieve the desired spectral response, after decomposing the latter into individual sine waves.

BACKGROUND OF THE INVENTION

Tapered optical fiber filters are well known in the art. They are made by tapering a single-mode optical fiber in such a way as to produce an interference between cladding modes, thereby creating a transmission which is wavelength dependent.

One such tapered fiber filter is described in Canadian Patent No. 1,284,282 issued May 21, 1991. It provides a passband filter comprising a plurality of successive biconical tapered portions on a single-mode fiber, such tapered portions having different profiles to produce the desired filtering characteristic.

Also, U.S. Pat. No. 4,946,250 of Aug. 7, 1990 by Gonthier et al., discloses a passband/stopband filter which is formed of two biconical tapers each having a given profile and being separated from each other by a small distance. This enables transmission of one signal of predetermined wavelength while stopping a second signal of a different wavelength.

Moreover, in applicant's Canadian patent application No. 2,258,140 filed Jan. 6, 1999, there is disclosed a method of making wavelength filters with a sinusoidal response or modulated sine response having any desired filtering amplitude and period of oscillation. The optical fiber filter produced thereby has two coupling regions at the extremities of an elongated central beating zone.

However, the above references do not disclose how to analyze a spectral response and extract the basic sine waves therefrom and then to produce a plurality of filters in the form of suitable fiber tapers and assemble them in line to achieve the desired response in the resulting clean-up filter.

OBJECTS AND SUMMARY OF THE INVENTION

It is an object of the present invention to produce clean-up filters, i.e. filters that are aimed at correcting the wavelength response of optical systems by decomposing the desired response into a plurality of individual responses and then by producing tapered fiber filters specifically designed to fit the individual responses so as to achieve a total response closely matching the desired total response.

Other objects and advantages will be apparent from the following description of the invention.

Optical systems often require a specific predetermined spectral response in order to achieve a desired function or operation. Optical filters are used to help achieve a desired response, but often such filters have predetermined characteristics and are not capable of producing a more complex spectral response when this is desired. The present invention provides such clean-up filters which are capable of producing any desired or predetermined response. To achieve this, the desired filter response is first analyzed with a computer program or algorithm that can automatically or manually simulate independent sine waves into which the desired response can be decomposed and which take the form of the following equation $$T = \beta[1 - \alpha \sin^2(\lambda - \lambda_0)\pi/\Lambda]$$

where:

T is the optical transmission of the filter, $\alpha$ is the amplitude of the filter, $\beta$ is the maximum transmission, $\lambda$ is the wavelength, $\lambda_0$ is the reference wavelength or center wavelength of the filter, and $\Lambda$ is the wavelength period.

The computer program also calculates the product of the function:

$$F = T_1 \times T_2 \ldots \times T_N$$

where:

F is the resulting filter function of the concatenation of the tapers that have the independent transmissions $T_1$ to $T_N$.

Such numerical formula simulates the concatenation of a plurality of tapered individual fiber filters required to achieve the total response F.

The model pre-supposes that the cladding modes between each taper are suppressed, which can be physically achieved in several known ways, for example, by leaving enough fiber length with the protective jacket on between consecutive tapers, by bending the fiber, or by making tapers that are single-mode, and so on. The parameters of the simulation are the parameters or each sine function, namely $\alpha_1$, $\beta_1$, $\lambda_1$, $\Lambda_1$, ... $\alpha_N$, $\beta_N$, $\lambda_N$, $\Lambda_N$. These parameters may be adjusted manually or with the aid of a computer program to simulate a response with the smallest deviation from the desired response. The mathematical method used may be based on a minimization of the square of the difference between the model and the desired filter response, but other algorithms may be used or developed.

After thus determining the parameters of the individual tapers, one can realize each individual filter component in practice. The number and type of tapers needed will vary with the desired shape of the total response. For this reason, one must be able to control the parameters mentioned above during the taper fabrication process, in order to achieve the desired total response. When tapering a single-mode fiber, the parameters may be controlled by producing a specific taper slope which itself will be controlled by the size of the heat source used to heat the fiber and by the pulling speed used to produce the desired taper. Using a small flame will cause an abrupt slope to be formed, which will usually result in the coupling of more than two modes, creating a modulated sine response, such as shown in Canadian Patent No. 1,284,282. Such modulated sine response is problematic in the model because it involves the control of additional parameters, such as the amplitude of each mode and the respective phases of the modes.

To avoid this problem, one may produce tapers or filters having a sinusoidal response with only two modes and wherein the amplitude period and phase are suitably controlled by providing two coupling regions at the extremities of an elongated tapered zone. Such filters and the method of their production are disclosed in applicant's Canadian Patent Application No. 2,258,140 filed Jan. 6, 1999 which is incorporated hereinto by reference. With such taper profiles, one can achieve almost any sine response.

However, when the amplitude of the sine function is less than 50%, a simpler profile can be used, namely a profile such as disclosed in Canadian patent No. 1,284,282, but with a longer taper produced with a wider brush of the flame. The wavelength is then controlled by the length of the taper, i.e. the number of oscillations in the elongation. Because the undesired three or higher order modes are caused by a taper slope that is too steep, one can reduce this effect by reducing the slope. Thus, one can obtain different responses by changing the flame brush width from 0 to a few mm. As one makes tapers with larger and larger brush widths, the modulation amplitude α will decrease. The appropriate brush width used to obtain a given spectral amplitude α can thus be determined by successive trials. The two other parameters of the sine response, i.e. the period Λ and the peak wavelength λ, are obtained by controlling the elongation of the taper. During elongation, oscillations in the optical transmission are observed; they correspond to the increase of beat lengths between the LP01 and LP02 modes. As explained in Canadian Patent No. 1,284,282, the number of beats is inversely proportional to the wavelength period; thus, as the taper is elongated, the period decreases. One can thus create periods from 400 nm to less than 1 nm. During fabrication, after the amplitude is set by the proper flame brush width, the elongation process is stopped when the predetermined period and wavelength properties are achieved.

Once a taper is fabricated by either method described above and the desired shape is realized, the taper is bonded to a substrate and suitably packaged for protection, for example in a steel tube. Each taper can be made individually and spliced with other such tapers or components, or they can be made in succession on the same single-mode fiber.

In summary, the present invention provides for an optical clean-up filter with a desired spectral response, which comprises a plurality of tapered fiber filters concatenated in-line on a single-mode optical fiber, said tapered fiber filters having specific wavelength response designs which closely match corresponding specific simulated responses resulting from a decomposition, by means of a computer program or algorithm, of the desired spectral response into individual specific simulated responses, whereby the in-line concatenation of said tapered fiber filters with responses of various specific designs produces the desired specific response in the clean-up filter.

In addition, the present invention provides for a method of manufacturing an optical clean-up filter with a desired spectral response, which comprises:

(a) decomposing the desired spectral response into individual simulated responses using a suitable computer program or algorithm;

(b) manufacturing tapered fiber filters with parameters that closely match the individual simulated responses; and (c) concatenating the tapered fiber filters on a single-mode fiber to produce the optical clean-up filter with a total response that closely matches the desired spectral response.

BRIEF DESCRIPTION OF THE DRAWINGS

A preferred embodiment of the invention will now be described with reference to the appended drawings in which.

DETAILED DESCRIPTION OF THE PREFERRED EMBODIMENT

Figure 1:
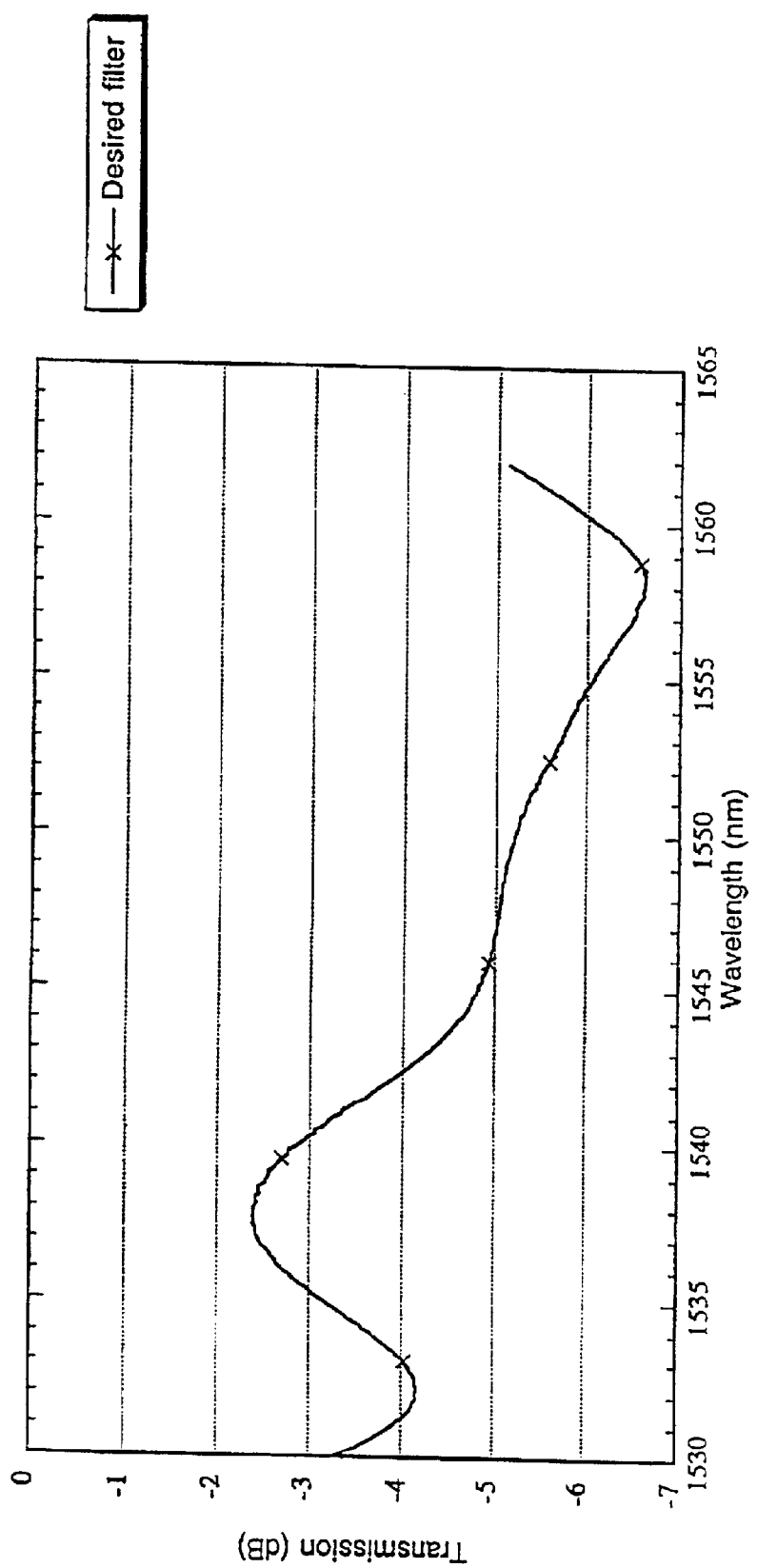
FIG. 1 is a graph showing a desired spectral response of a filter.

Referring to the drawings, FIG. 1 shows a graphical representation of a desired spectral response in an optical filter. Such specific response may be needed to produce a desired function in an optical device.

Figure 2:
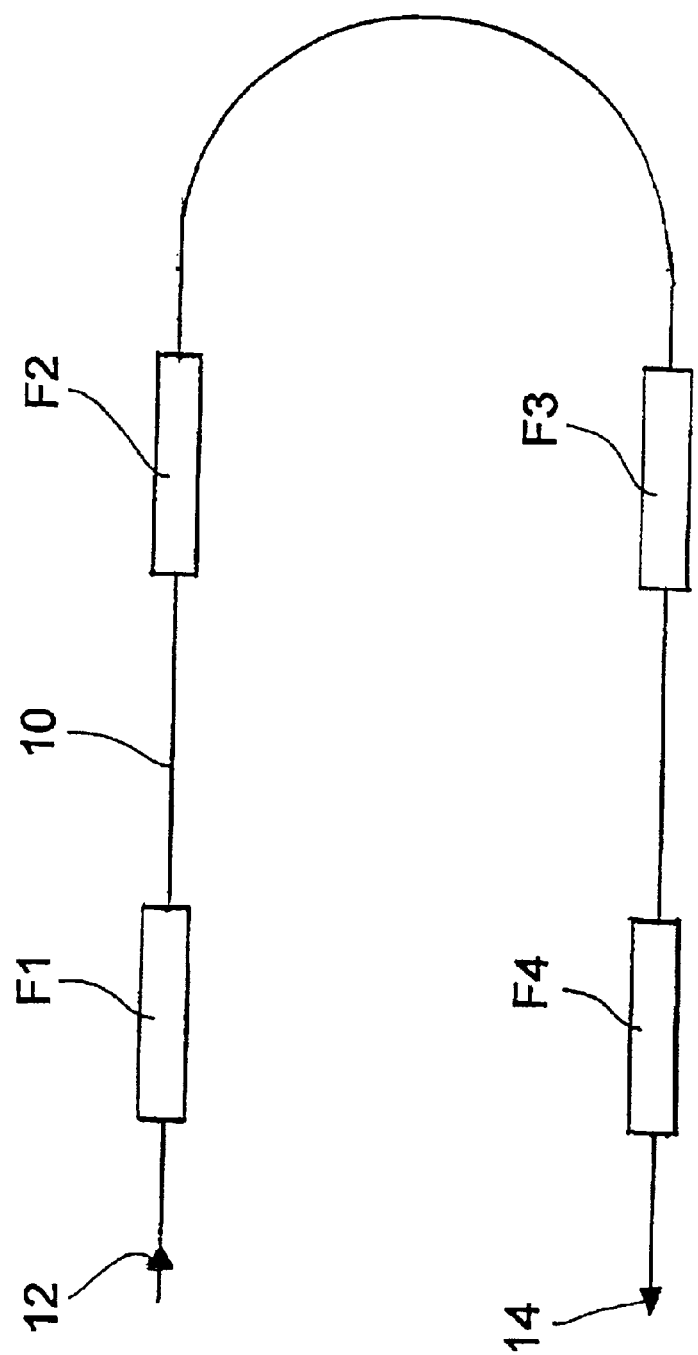
FIG. 2 shows diagrammatically the concatenation of tapered filters to simulate the numerical formula representing the desired spectral response of FIG. 1.

FIG. 2 illustrates the concatenation of four filters F1, F2, F3 and F4 produced on a standard single-mode fiber 10 having a jacket which acts as a cladding mode filter. The fiber 10 may, for example, be the standard matched cladding fiber SMF-28 supplied by Corning. In the arrangement shown in FIG. 2, the light goes in at 12 and comes out at 14.

Figure 3:
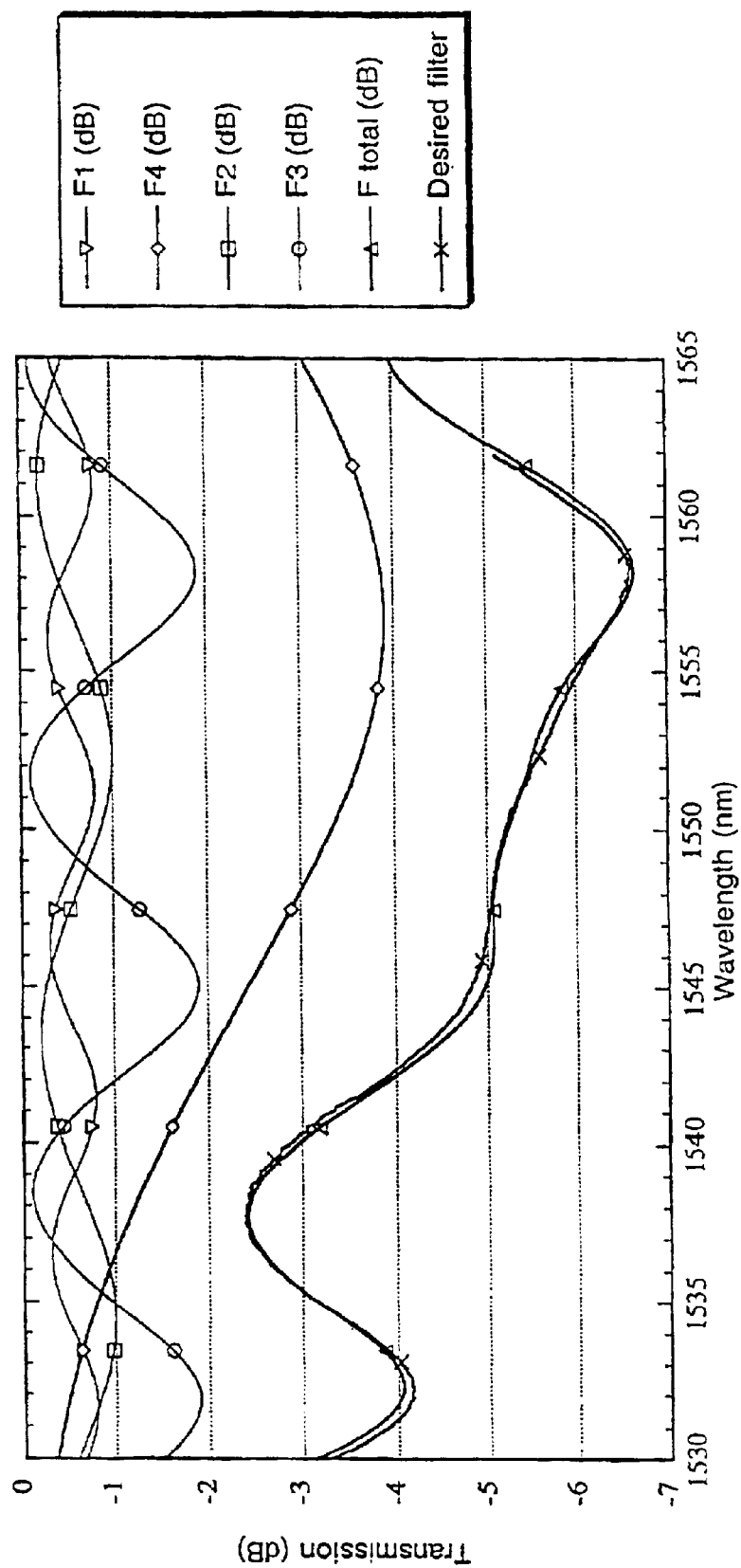
FIG. 3 is a graph showing four parameters of individual filters which may be adjusted to provide a filter simulation with the smallest possible deviation from the desired response.

In FIG. 3 there is illustrated a simulation of a filter having a total response as close as possible to the desired filter response of FIG. 1, by providing a simulation of four parameters each having a sine function $\alpha_1, \beta_1, \lambda_1, \Lambda_1, \ldots \alpha_4, \beta_4, \lambda_4, \Lambda_4$ and adjusting these parameters so as to obtain the smallest possible deviation. In this embodiment, four tapers F1, F2, F3 and F4 are used to model the desired profile within a deviation of 0.25 dB, although it should be understood that the number of tapers can vary depending on the desired shape of the total filter F response. After determining by simulation the parameter of each taper, such taper is realized by using a fabrication process that enables control of these parameters.

Figure 4:
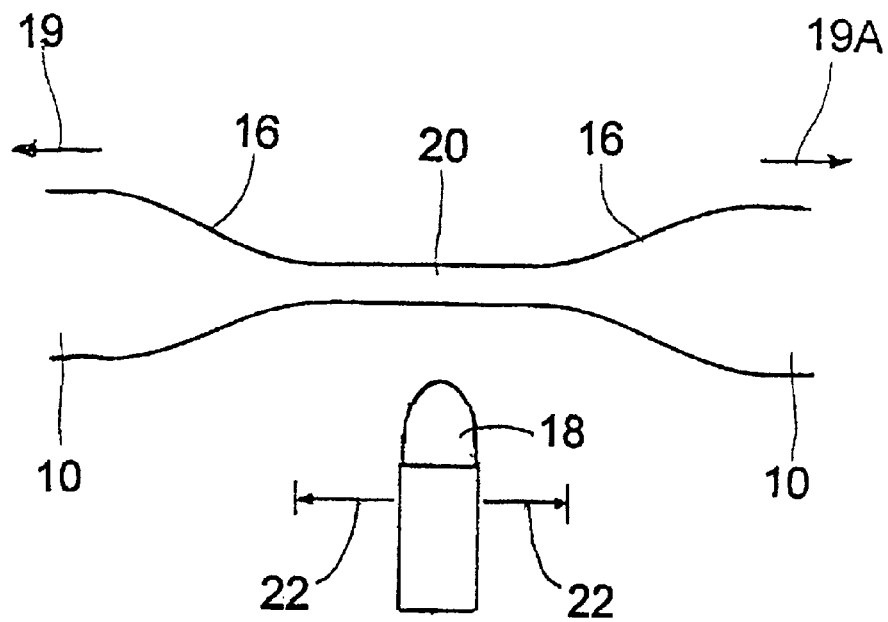
FIG. 4 shows one type of taper that may be realized for the purposes of this invention.

One such taper and process of making the same are illustrated in FIG. 4. When tapering a single-mode fiber 10, the taper slope 16 will be controlled by the size of the heat source or flame 18 and by the pulling speed represented in FIG. 4 by arrows 19, 19A. Because undesired three and higher order modes are caused by a taper slope that is too steep, one can reduce this modulating effect by making slope 16 more gradual by increasing the brush width 22 of the flame 18 from 0 to a few mm. In this manner, the total amplitude and the amplitude of the modulations will decrease. If the total amplitude is limited to 50%, the modulation is reduced to a few percent, making such response almost entirely sinusoidal. If the brush width 22 is further increased, the modulation completely disappears. Thus, at 20% total amplitude, no extra modulation is observed. The wavelength period is then controlled by the length of the taper 20, i.e. the number of oscillations in the elongation. The control of the length 20 enables the realization of spectral responses with periods from 400 nm to a few nm.

Figure 5:
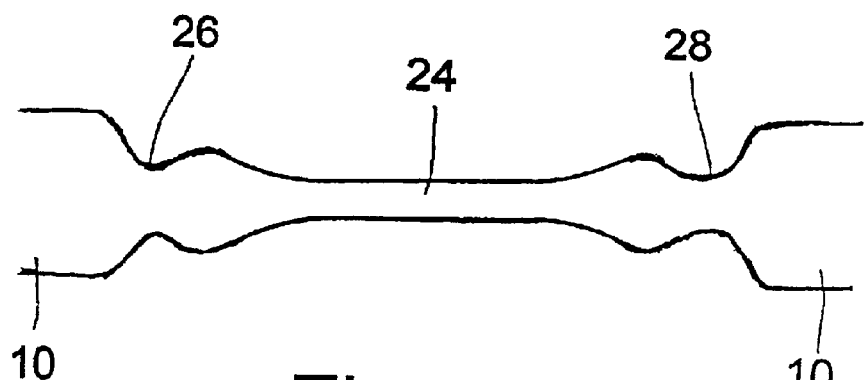
FIG. 5 shows another type of taper that may be realized for the purposes of this invention.

Tapers, such as shown in FIG. 4, are particularly suitable for filters with amplitudes of 1 to 3 dB, since higher amplitudes, e.g. 20–30 dB, will excite 3 or more modes. To control the response with such higher amplitudes, one can use tapers shown in FIG. 5 which are suitable for achieving a response having any desired filtering amplitude and period of oscillation in a filter made by tapering a single-mode fiber 10. This structure has a central beating region 24 and two coupling regions at its extremities produced by non-adiabatic tapers 26, 28. In producing this structure, the ratio between LP01 and LP02 is readily controlled. The period, as in the case of the taper of FIG. 4, is controlled by the length of the beating region 24. The realization of such filter is disclosed in applicant's Canadian Patent Application No. 2,258,140 filed Jan. 6, 1999, entitled "OPTICAL FIBER FILTERS AND METHOD OF MAKING THE SAME".

Figure 6:
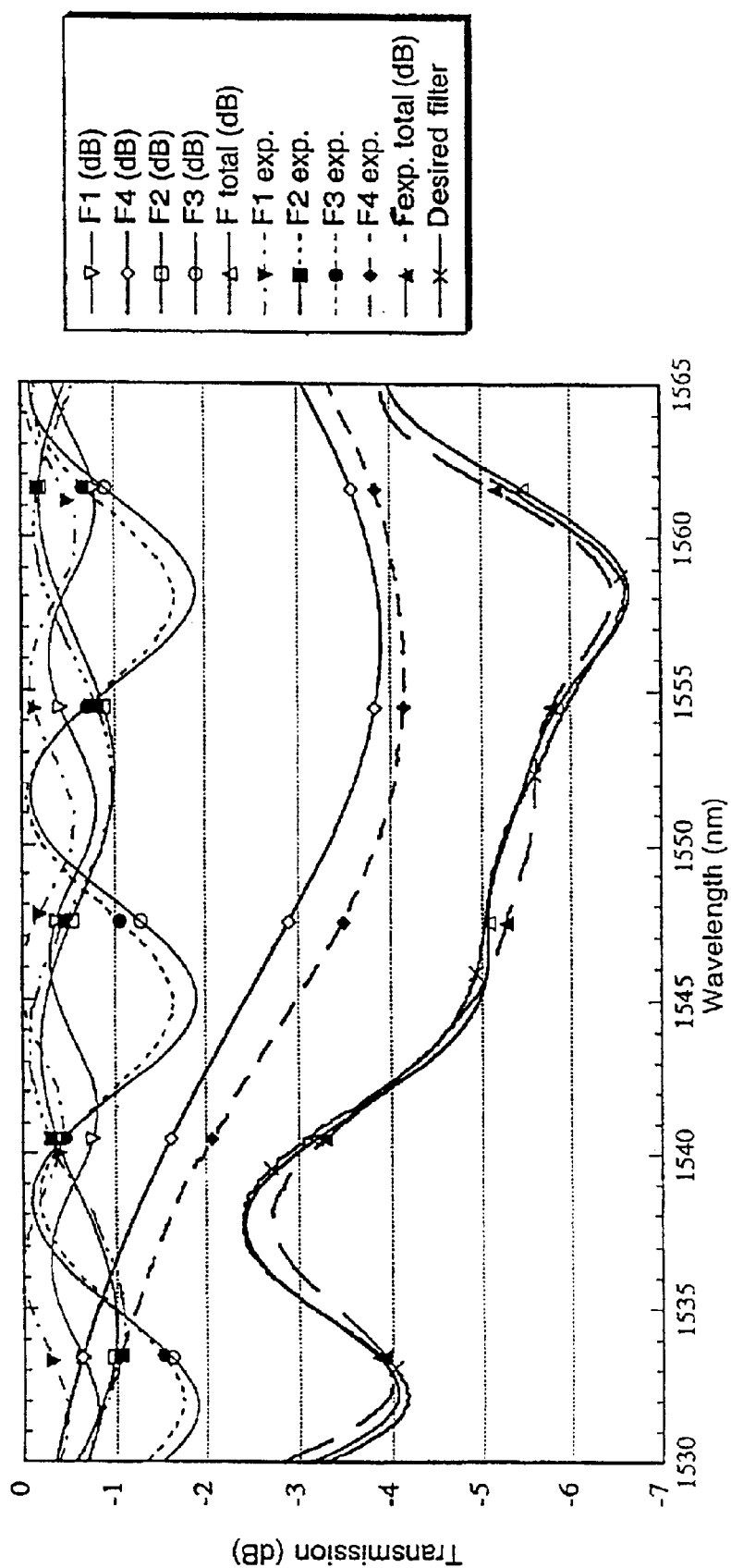
FIG. 6 is a graph of realized taper responses compared with the model.

FIG. 6 illustrates the realized taper responses achieved experimentally. In this design, four tapers were made F1 exp., F2 exp., F3 exp. and F4 exp., three of which were small amplitude tapers F1 exp., F2 exp. and F3 exp. produced as shown in FIG. 4 and the last taper F4 exp. with 4 dB amplitude had the profile shown in FIG. 5. Because this latter profile gives a lot of flexibility, the parameters thereof were adjusted to compensate for the errors in the first three tapers. The fourth taper F4 exp. was made directly in line with the three first tapers F1 exp., F2 exp. and F3 exp., and its response was adjusted to best match the total response F exp. total to the desired filter response. In this case the error between the total experimental response and the desired filter response was 0.4 dB and with greater control of taper performance, it would be possible to achieve even closer match. This would also permit the realization of more complex taper responses, such as a modulated sine response, which may be used as a new tool in the decomposition of the desired filter response, leading to a reduction of the number of taper structures needed to achieve a satisfactory matching of the response.

It should be noted that the invention is not limited to the specific embodiment described above, but that various obvious modifications can be made by a person skilled in the art without departing from the spirit of the invention and the scope of the following claims.

What is claimed is:

1. An optical clean-up filter with a desired complex spectral response, which comprises a plurality of tapered fiber filters concatenated in line on a single-mode optical fiber, said tapered fiber filters having specific wavelength response designs which closely match corresponding individual specific simulated responses resulting from a prior decomposition by means of a computer program or algorithm of the desired complex spectral response into said individual specific simulated responses, and subsequent in-line concatenation of said tapered fiber filters with the specific wavelength response designs to produce the desired complex spectral response in the cleanup filter.

2. An optical clean-up filter according to claim 1, in which the tapered fiber filters that are produced to match simulated responses with amplitudes of less than 3 dB have a tapered profile with a central beating region and a taper slope adapted to minimize higher order modulation in the resulting responses.

3. An optical clean-up filter according to claim 1, in which the tapered fiber filters that are manufactured to match simulated responses with amplitudes of more than 3 dB have a tapered profile having a central beating region and a coupling region at each end of said beating region with a non-adiabatic taper, thereby forming a tapered filter adapted to minimize modulation in the resulting responses.

4. An optical clean-up filter according to claim 1, in which the plurality of tapered fiber filters are produced individually and then concentrated with one another by splicing them in-line on a single-mode optical fiber.

5. An optical clean-up filter according to claim 1, in which the plurality of tapered fiber filters are produced directly in-line on a single-mode optical fiber.

6. A method of manufacturing an optical filter with a desired spectral response, which comprises:

(a) initially decomposing the desired spectral response into individual simulated response using a suitable computer program or algorithm;

(b) then manufacturing tapered fiber filters with parameters that closely match the individual simulated response; and (c) concatenating said tapered fiber filters on a single-mode fiber to produce the optical filter with a total response that closely matches the desired spectral response.

7. A method according to claim 6, in which, the computer program for decomposing the desired spectral response into individual simulated responses of independent sine waves uses the following equation:

$$T=\beta[1-\alpha \sin^2(\lambda-\lambda_0)\pi/\Lambda]$$

where:

T is the optical transmission of the filter, $\alpha$ is the amplitude of the filter, $\beta$ is the maximum transmission, $\lambda$ is the wavelength, $\lambda_0$ is the reference wavelength or center wavelength of the filter, and $\Lambda$ is the wavelength period.

and the product function for a plurality of such responses is calculated using the following equation:

$$F=T_1 \times T_2 \ldots \times T_N$$

where:

F is the resulting filter function of the concatenation of the tapers that have the independent transmissions $T_1$ to $T_N$.

8. A method according to claim 6, in which the tapered filters are manufactured separately to match individuals simulated responses and then are concatenated in-line by splicing them on a single-mode fiber.

9. A method according to claim 6, in which the tapered filters are produced in-line on the same single-mode fiber to match the individual simulated responses.

10. A method according to claim 6, in which, upon their manufacture, the tapered fiber filters are bonded to a substrate and packaged in a protective packaging.

* * * * *

UNITED STATES PATENT AND TRADEMARK OFFICE
CERTIFICATE OF CORRECTION

PATENT NO. : 6,718,095 B1
DATED : April 6, 2004
INVENTOR(S) : François Gonthier

It is certified that error appears in the above-identified patent and that said Letters Patent is hereby corrected as shown below:

Title page,
Item [73], Assignee, "ITF Technologies Inc." should read -- ITF Technologies Optiques Inc. --.

Column 6,
Lines 12 and 18, "response" should read -- responses --.

Signed and Sealed this

First Day of March, 2005

JON W. DUDAS
*Director of the United States Patent and Trademark Office*